United States Patent [19]

Ikegami et al.

[11] 4,362,646

[45] Dec. 7, 1982

[54] PROCESS FOR THE PRODUCTION OF FIBROUS ACTIVATED CARBON

[75] Inventors: Shigeru Ikegami, Mishima; Minoru Hirai; Kazuo Izumi, both of Shizuoka, all of Japan

[73] Assignee: Toho Beslon Co., Ltd., Tokyo, Japan

[21] Appl. No.: 191,616

[22] Filed: Sep. 29, 1980

[30] Foreign Application Priority Data

Sep. 28, 1979 [JP] Japan .................. 54-124891

[51] Int. Cl.³ .............. C01B 31/10; B01J 20/20; D01F 9/22; D01F 9/12
[52] U.S. Cl. .................. 252/422; 252/447; 264/29.2; 423/447.2
[58] Field of Search .............. 252/422, 447; 423/447.2, 447.4, 447.5, 447.6; 264/29.2, 29.7

[56] References Cited

U.S. PATENT DOCUMENTS

| | | | |
|---|---|---|---|
| 3,729,549 | 4/1973 | Gump et al. | 423/447.5 |
| 3,849,332 | 11/1974 | Bailey et al. | 252/422 |
| 3,997,638 | 12/1976 | Manning et al. | 264/29.7 |
| 4,002,426 | 1/1977 | Chenevey et al. | 264/29.2 |
| 4,118,341 | 10/1978 | Ishibashi et al. | 252/421 |
| 4,256,607 | 3/1981 | Yoshida et al. | 252/421 |
| 4,285,831 | 8/1981 | Yoshida et al. | 252/422 |

FOREIGN PATENT DOCUMENTS 6919555  7/1970  Netherlands .............. 423/447.5

*Primary Examiner*—P. E. Konopka
*Attorney, Agent, or Firm*—Sughrue, Mion, Zinn, Macpeak, and Seas

[57] ABSTRACT

A fibrous activated carbon having high adsorptivity and excellent mechanical properties is produced by preoxidizing an acrylonitrile-based fiber containing a specific amount of an iron compound at a specific initial heat-treatment temperature and then activating.

17 Claims, 3 Drawing Figures

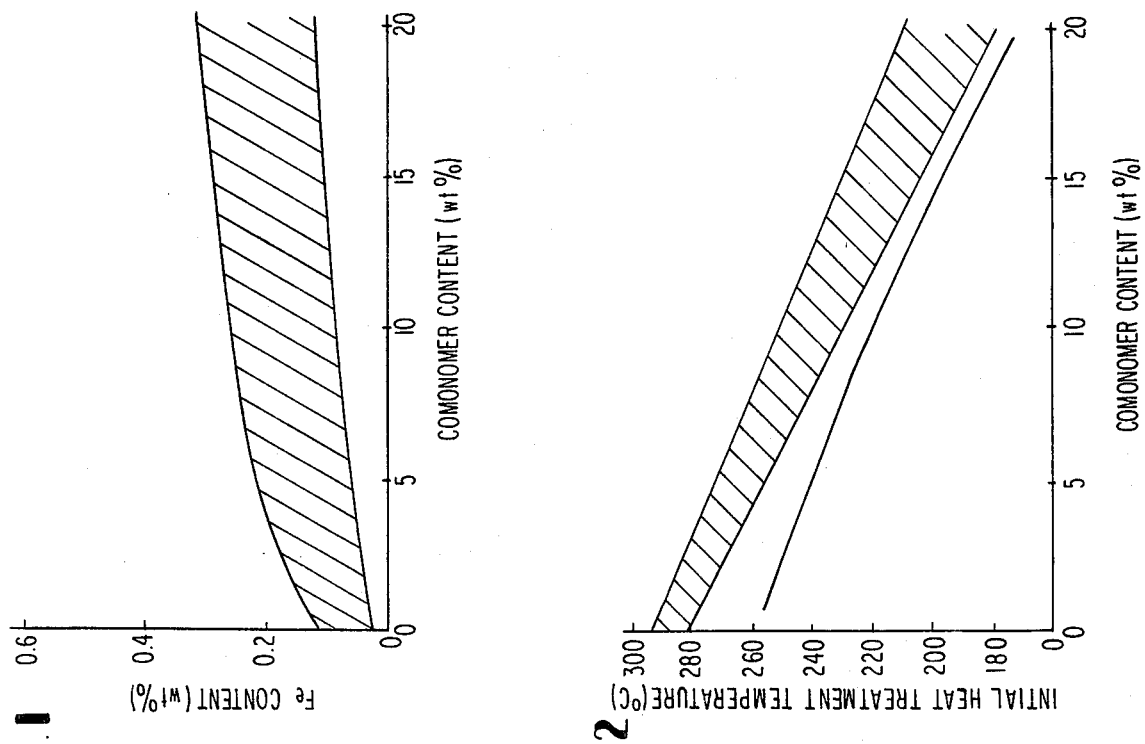
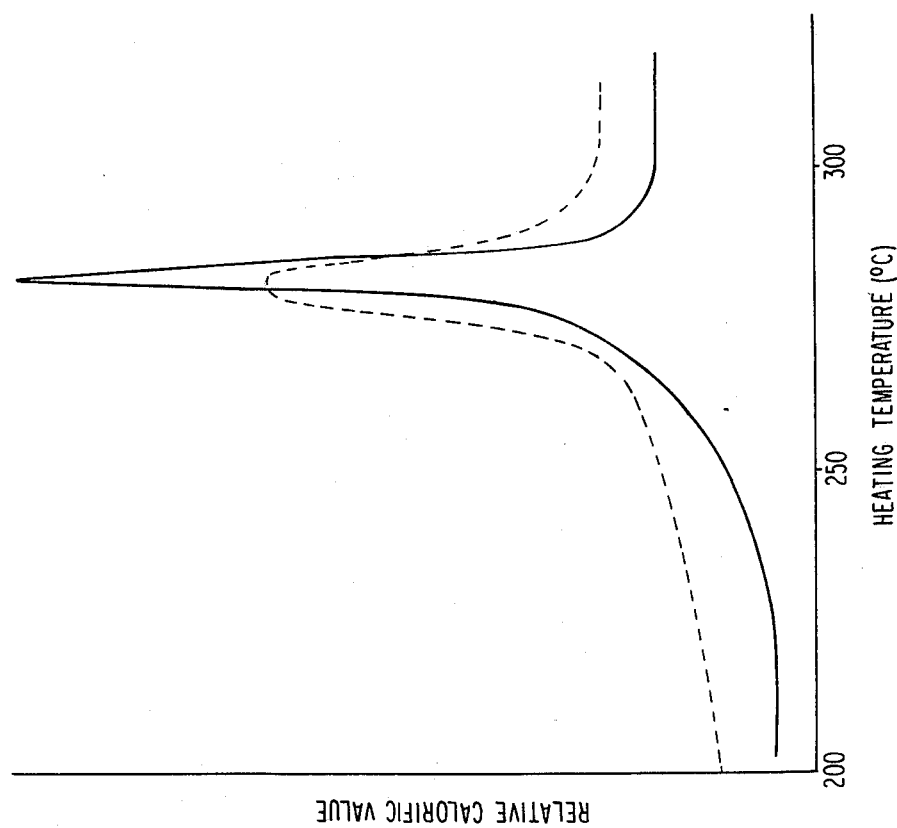

PROCESS FOR THE PRODUCTION OF FIBROUS ACTIVATED CARBON

BACKGROUND OF THE INVENTION

1. Field of the Invention

This invention relates to a process for the production of fibrous activated carbon having high adsorptivity and excellent mechanical properties from a starting material of acrylonitrile-based fiber.

2. Description of the Prior Art

Fibrous activated carbon in a tow, fabric or felt form has received increasing attention in recent years as an adsorbent, filter, or the like, for use, e.g., in solvent recovery equipment.

For the production of such fibrous activated carbon, a method in which a cellulose based fiber, phenol resin fiber, acrylonitrile-based fiber, or the like is carbonized and activated has heretofore been proposed. Of these fibrous activated carbons, the fibrous activated carbon produced from acrylonitrile-based fiber has unique adsorption capabilities because of the nitrogen atoms contained therein and, furthermore, has excellent mechanical strength. Thus, it has various applications.

A process for the production of fibrous activated carbon from a starting material of acrylonitrile-based fiber usually comprises the following steps:

A preoxidation step wherein the feed fiber is preoxidized in an oxidizing gas atmosphere, such as oxygen or the like, at a temperature of from 150° C. to 300° C.; and an activation step wherein the preoxidized fiber obtained in the preoxidation step is treated in an atmosphere of steam, carbon dioxide gas or the like at a temperature of from 700° C. to 1,000° C.

Of these steps, the preoxidation step exerts a significant influence on the yield, adsorptivity, and mechanical properties of the final product.

In the preoxidation step, an abrupt generation of heat of reaction is involved, since the heat of reaction is evolved as the cyclization and crosslinking of molecules constituting the acrylonitrile based fiber proceeds. As a result, when fibers having a diameter of more than 1.5 denier the surface of the fibers melts and softens, and fibers adjacent to each other easily stick together (this phenomenon is hereinafter referred to as "coalescence"). In order to avoid such coalescence, the preoxidation has heretofore been carried out at low temperatures over very long periods of time.

The occurrence of such coalescence in the preoxidation step gives rise to the problems that fibers are easily cut, and therefore stable operation becomes difficult. Furthermore, such coalescence exerts undesirable influences on the yield of fibrous activated carbon and performance of the fibrous activated carbon obtained.

As the comonomer content of fiber is increased and the temperature at which the heat-treatment is carried out is raised, the coalescence of fibers at the oxidation step occurs more easily. Therefore, when an acrylonitrile-based fiber having a high comonomer content, that is, more than about 6 wt% is used as a starting material, it is necessary to carry out the preoxidation or heat-treatment at low temperatures for long periods of time. Thus, in the prior art process for the production of fibrous activated carbon, the time required for the oxidation step constitutes about 80% of the total time required for the total process. This is very inefficient and is a main factor for the increasing production costs of fibrous activated carbon.

SUMMARY OF THE INVENTION

It has now been found according to this invention that the use of an acrylonitrile-based fiber containing an iron compound prevents the coalescence of fibers at the preoxidation step, markedly shortens the preoxidation time and furthermore, provides a fibrous activated carbon having excellent performance in high yields.

This invention, therefore, provides a process for producing a fibrous activated carbon which comprises preoxidizing an acrylonitrile-based fiber having a diameter of from 1.5 to 15 denier containing an iron compound in the range satisfying the equation (1)

$$0.02\sqrt{X} + 0.02 \leq y \leq 0.05\sqrt{X} + 0.10 \tag{1}$$

wherein X is the wt% content of comonomer in the acrylonitrile based fiber and Y is the wt% iron content of an initial heat-treatment temperature satisfying the equation (2)

$$280 - 5X \leq Z \leq 290 - 4X \tag{2}$$

wherein X has the same meaning as in equation (1) and Z is the initial heat-treatment temperature (°C.) and then activating the preoxidized acrylonitrile-based fiber.

BRIEF DESCRIPTION OF THE DRAWINGS

FIG. 1 shows the range of the iron content defined by the equation (1); and

FIG. 2 shows relationship of the initial heat treatment temperature range with the comonomer content of an acrylonitrile fiber.

FIG. 3 shows curves for relative calorific value during the oxidation.

DETAILED DESCRIPTION OF THE INVENTION

By the term "initial heat-treatment temperature" as used in this invention is meant a treatment temperature conducted until the equilibrium water content of the preoxidized fiber is increased to at least 3 wt% (that is 3% by weight, based on the weight of the fiber). The equilibrium water content as herein used is a value measured to indicate the extent of preoxidation of fiber, and it is defined as follows:

A completely dried preoxidized fiber is allowed to stand in a desicator maintained at 25° C. and 80% RH (relative humidity), an increase with time in the weight of the fiber is measured, and the amount of adsorbed water (based on the weight of the fiber). When there is no further increase in the weight of the fiber, the amount of water contained in the fiber at that time is defined as the equilibrium water content.

By the term "acrylonitrile-based fiber" as used in this invention is meant a fiber made of polyacrylonitrile, or a copolymer thereof comprising at least about 60% by weight acrylonitrile. When a fiber comprising a copolymer containing from about 6 to 40% by weight, preferably 8 to 15% by weight of at least one comonomer is used specific effects of the present invention appear remarkably.

In the present invention, mixtures of homopolymers and copolymers or mixtures of copolymers themselves can be used to produce the fiber. Moreover, copolymers containing less than about 60% by weight acrylonitrile can be used in admixture with acrylonitrile polymers to produce the fiber, provided that the amount of acrylonitrile in the ultimate fiber exceeds about 60% by weight.

Comonomers which can be introduced into the above copolymers include addition-polymerizable vinyl compounds such as vinyl chloride, vinylidene chloride, vinyl bromide, acrylic acid, methacrylic acid, itaconic acid; the salts (e.g., the sodium salts) of these acids; derivatives of these acids, e.g., acrylic acid esters (e.g., alkyl esters containing 1 to 4 carbon atoms in the alkyl moiety such as methyl acrylate, butyl acrylate, and the like), methacrylic acid esters (e.g., alkyl esters containing 1 to 4 carbon atoms in the alkyl moiety such as methyl methacrylate, and the like); acrylamide, N-methylolacrylamide; allyl sulfonic acid, methallyl sulfonic acid, vinyl sulfonic acid, and the salts (e.g., the sodium salts) of these acids; vinyl acetate; 2-hydroxymethyl-ethylacrylate, 2-hydroxymethyl-methylacrylate; 2-hydroxyethylacrylate; 2-hydroxyethylmethacrylate; 2-hydroxymethylacrylonitrile; 2-hydroxyethylacrylonitrile; 2-chloroethylacrylate; 2-hydroxy-3-chloropropylacrylate; vinylidene cyanide; α-chloroacrylonitrile; and the like. In addition, those compounds described in U.S. Pat. No. 3,202,640 can be used.

The degree of polymerization of these polymers or polymer mixtures is sufficient if a fiber can be formed therefrom. Generally, useful polymers contain from about 500 to about 3,000 repeating units, and preferably from 1,000 to 2,000.

These acrylonitrile based polymers can be produced using hitherto known methods, such as, for example, suspension polymerization or emulsion polymerization in an aqueous system, or solution polymerization in a solvent. These methods are described, for example, in U.S. Pat. Nos. 3,208,962, 3,287,307 and 3,479,312.

Spinning of the acrylonitrile-based polymer can be carried out by hitherto known methods. Examples of spinning solvents which can be used include inorganic solvents such as a concentrated solution of zinc chloride in water, concentrated nitric acid and the like, and organic solvents such as dimethylformamide, dimethylacetamide, dimethyl sulfoxide, and the like. In particular, when a concentrated solution of zinc chloride in water is used, the residual zinc chloride in the fiber reduces the activation period, and moreover, a fiber having high strength can be obtained.

The diameter of the fiber which can be used in the present invention is about 1.5 to about 15 denier from the standpoint for obtaining fibrous activated carbon having high mechanical properties and adsorbability. The effects of the present invention during the preoxidation appear especially significant when the fiber having a diameter of from about 2.0 to 7.0 denier is used, and when tow comprising more than about 40,000 filaments (it is usually not more than about 300,000 filaments), felt or fabric having a weight of more than about 150 g/cm$^2$ (it is usually not more than about 800 g/cm$^2$) is used.

The acrylonitrile-based fiber that is used in the present invention may be in any form of tow, web, felt, woven fabric, nonwoven fabric, etc.

In general, in the production of the fibrous activated carbon from acrylonitrile-based fiber, fibers having a high comonomer content (usually up to 40 wt%) are preferably used as a starting material (hereinafter, called "a precursor fiber"). The reason for this is that as the comonomer content increases, the orientation of the precursor fiber lowers, resulting in the disturbance of the crystal structure and facilitating activation of the precursor fiber; therefore, a high yield of fibrous activated carbon is obtained.

For example, the influences of the comonomer (i.e., methyl acrylate) content on the yield and performance of the fibrous activated carbon are shown in Table 1 for the case where an acrylonitrile-based fiber made of an acrylonitrile-methyl acrylate copolymer is used as a precursor fiber.

TABLE 1

| Comonomer Content of Precursor Fiber (wt %) | Yield of[1] Fibrous Activated Carbon (wt %) | Single Fiber Strength | | |
|---|---|---|---|---|
| | | Precursor[2] Fiber (g/d) | Fibrous[3] Activated Carbon (Kg/mm$^2$) | (g) |
| 2.1 | 10 to 14 | 5 to 6 | 20 to 30 | 1.0 to 2.5 |
| 5.3 | 12 to 18 | 3 to 5 | 25 to 35 | 1.5 to 3.3 |
| 9.6 | 23 to 28 | 3 to 4 | 25 to 35 | 2.0 to 4.0 |

[1]Yield of fibrous activated carbon having a specific surface area of 800 to 900 m$^2$/g based on the acrylonitrile-based fiber.
[2]Fiber of 3 denier
[3]A fibrous activated carbon having a specific surface area of 800 to 900 m$^2$/g.

From the above results, it can be seen that as the comonomer content increases, the yield increases and fibrous activated carbon having a high fiber strength is obtained.

Also, in the production of the precursor fiber, as the comonomer content increases, the stretching is made easy and the spinnable properties are improved. Therefore, this leads to the advantages that the fluff, denier spot, etc. of the obtained precursor fiber are reduced and a fibrous activated carbon having a more uniform quality can be obtained with ease. However, as the comonomer content increases the tendency towards coalescence of fibers also increases.

Iron compounds which can be used in this invention include various iron salts such as ferric or ferrous sulfate, ferric or ferrous chloride, ferric or ferrous nitrate, ferric or ferrous ammonium nitrate, ferric or ferrous oxide and complex salts such as sodium or potassium ferrocyanide and sodium or potassium ferricyanide. Either divalent iron or trivalent iron can be used. It is preferred to use a water-or organic solvent-soluble iron compound.

To incorporate the iron compound into the acrylonitrile-based fiber various methods may be used, such as a method wherein the powder or solution of iron compound is added to a spinning dope of an acrylonitrile-based polymer, a method wherein the solution is impregnated to a gel fiber after spinning and prior to drying and method wherein fibers (after drying) are soaked with the iron compound solution can be used. In the case of the third method wherein fibers are soaked with the iron compound solution, water-or organic-soluble iron salts are used. In order to uniformly permeate the iron salt in the interior of fibers, it is desirable to keep the temperature of the solution with which the fiber is soaked, at from about 10° to 80° C., and preferably from about 50° to 70° C. The diameter of the powder of iron compounds preferably is less than 300 mesh, and the concentration of the solution is usually from about 0.1 to 10%.

To further improve the permeation of the iron compound into the fiber, a surface active agent can be used in combination therewith. The surface active agents include for example, polyethylene glycol, a phosphoric acid ester, an aliphatic acid ester, mineral oil, and the like are used. They are usually used in combination of two or more and are used in an amount of from about 0.1 to 0.5 wt% based on the weight of the fiber.

As can be seen from following Tables 3 and 4, the optimum iron compound content varies according to the comonomer content of the fiber used, and the iron compound content is required to be present in the range satisfying the equation (1). This range is illustrated in FIG. 1 as a hatched area.

Below the range, no effect of this invention can be obtained, whereas above the range, the yield and fiber strength of the obtained fibers activated carbon undesirably lowered.

The acrylonitrile-based fiber containing the iron compound in the above defined range is preoxidized in an oxidizing atmosphere.

The temperature at which the preoxidation is carried out is influenced by the comonomer content of the acrylonitrile-based fiber, and as the comonomer content increases, the coalescence and burning of fibers owing to the abrupt generation of heat of reaction at an initial stage of the preoxidation occurs more easily. Therefore, it is important to choose, in particular, an initial heat-treatment temperature.

Therefore, the optimum initial heat-treatment temperature varies according to the iron content and comonomer content, and it should be in the range as illustrated in FIG. 2 as a hatched area, i.e., the range satisfying the equation (2).

At temperatures below the range, shortening of the preoxidation time cannot be attained. On the other hand, at temperatures above the range, the coalescence and burning of fibers occur frequently, as a result of which the stable operation becomes difficult, and furthermore the quality of the product obtained is significantly reduced. The maximum temperature which can be applied to acrylonitrile-based fibers not-containing an iron compound is shown by curve A in FIG. 2.

In general, the preoxidation is carried out while raising the temperature in stages. Of course, in the case of the acrylonitrile-based fiber containing the iron compound according to this invention, after the treatment at the above described suitable initial heat-treatment temperature, the fiber may be treated at higher temperatures, but less than about 400° C., in stages.

Although the preoxidation processing in an oxidizing atmosphere is generally carried out in air, any mixture of oxygen and inert gases such as nitrogen can be used provided that they contain oxygen in an amount not less than about 15 vol%. In addition, the processing can be carried out in an atmosphere of hydrogen chloride gas, or sulfur dioxide. In these cases, however, mixtures of these gases and air (with a gas-mixture oxygen content of from about 5 to 20 vol%) are generally used.

Preferably, tension is applied to the fiber(s) in such a manner that the shrinkage at a particular preoxidation temperature reaches from about 50 to 90%, preferably from about 60% to about 80% of the degree of free shrinkage at that temperature. In this case, when the shrinkage is below about 50%, the adsorption property of the filament is insufficient for practical use, whereas when the shrinkage is above about 90%, the mechanical properties of the fiber obtained after the activation processing are reduced.

The term "degree of free shrinkage" as used in the description herein of the present invention designates the ratio of the shrinkage to the original length, that is, when the fiber under a tension of 1 mg/d is allowed to shrink in an oxidizing atmosphere at a specific temperature with oxidation proceeding, the ratio of the shrinkage to the original length is designated as the degree of free shrinkage at that temperature.

The major advantages of this invention obtained by incorporating the iron compound into the acrylonitrile-based fiber are as follows:

(1) No coalescence and burning of fibers occurs at higher preoxidation temperatures than can be used in the prior art method and, therefore, the preoxidation time can significantly be shortened.

(2) Even at the same preoxidation temperature as in the prior art method, the oxidation rate is markedly high as compared with that is the prior art method and, therefore, the preoxidation time can be shortened.

(3) The activation time can be shortened in comparison with the prior art method.

(4) The fibrous activated carbon obtained has a high nitrogen content and excellent adsorptivity and mechanical performance.

(5) The fibrous activated carbon obtained has high processability, especially in producing felt or fabric, due to its increased frictional properties.

As described above, according to the method of this invention, the productivity, in particular, of the preoxidation step, is increased. For instance, an acrylonitrile-based fiber comprising 92% by weight of acrylonitrile and 8% by weight of methyl acrylate and containing 0.21% by weight (as iron) of ferrous sulfate was oxidized, and the results obtained are shown in Table 2, together with those obtained by a prior method in which no iron was added.

TABLE 2

| Run No. | Oxidation Conditions Temp. (°C.) × Time (hrs) | | State of Oxidized Fiber | Equilibrium Water Content (%) |
|---|---|---|---|---|
| | Initial Stage | Later Stage | | |
| 1 | 240 × 2 | 260 × 1.5 | no coalescence | 11.4 |
| 2 | 245 × 1.5 | 265 × 1 | no coalescence | 11.7 |
| 3 | 250 × 1 | 275 × 0.5 | slight coalescence | 11.0 |
| 4 | 230 × 3 | 250 × 2.5 | marked coalescence | 11.2 |
| 5 | 240 (fibers burn at once) | | burning | — |

Run Nos. 1, 2 and 3 are according to the method of this invention, and Run Nos. 4 and 5, according to the prior method.

As is apparent from the results as shown in Table 2, when the acrylonitrile-based fiber containing iron is oxidized at high initial heat-treatment temperatures, no coalescence occurs and the preoxidation rate is high, and therefore the preoxidation time can be reduced to about ⅓ or less of the prior art method. Thus, the method of this invention permits rapid and efficient production of fibrous activated carbon and is of high value from a commercial standpoint.

Although the mechanism responsible for the iron compound producing the above-described effect in the preoxidation step is not clear, from the thermal analysis results obtained using a differential scanning calorimeter that the main peak of the exotherm curve appearing on heating the acrylonitrile-based fiber is sharpened and the total exothermic heat is reduced by the introduction of the iron compound. Therefore, it is believed that the iron compound contained in the acrylonitrile-based fiber materially increases the softening temperature of the fiber and accelerates the cyclization reaction.

Particularly, FIG. 3 shows relative calorific values with respect to heating temperatures of the oxidation. The dotted line shows a curve for an acrylonitile-based fiber consisting of 90% by weight of acrylonitrile and 10% by weight of methylacrylate. The solid line shows a curve for the same fiber except that the fiber contained $FeCl_3$ in an amount of 0.2 wt% (calculated as iron).

It is also believed that the iron compound attaching to or contained in the fiber physically dissipates the heat of reaction and prevents the accumulation of heat of reaction, and, as a result, the coalescence-preventing effect is exhibited.

It is desirable to preoxidize the acrylonitrile-based fiber containing the iron compound until the equilibrium water content reaches from 8 to 13% preferably from 9 to 11% (corresponding to the amount of bonded oxygen of from 60 to 95%, preferably from 72 to 86%, of the saturated amount of bonded oxygen possible in the fiber) because a fibrous activated carbon having a high adsorbability can be obtained in a high yield.

The heat-treating period in the preoxidation processing is determined depending on the processing temperature, and is generally from about 0.5 hour to 24 hours. When heat-treating is conducted at a lower temperature a longer period of time is necessary.

The preoxidation processing of the fiber is followed by activation processing.

This activation processing can be accomplished by physical activation or a method comprising impregnating the fiber with an activating agent used in chemical activation and then applying physical activation. These methods are described, for example, in U.S. Pat. Nos. 2,790,781 and 2,648,637.

For instance, where the activation is carried out in an activation gas, $CO_2$, $NH_3$, steam or a mixed gas thereof (e.g., $CO_2+H_2O$) is used (in this case, the allowable amount of oxygen is up to an extent such that the fiber does not burn, and the amount of oxygen is generally not more than 3 vol%). One or more inert gases such as $N_2$, Ar or He may be contained in an activation gas in an amount of up to about 50 vol% (e.g., $CO_2+N_2$, etc.). The activation is generally carried out at a temperature of from about 600° C. to 1,300° C., preferably about 800° C. to about 1,300° C. for from about 6 seconds to 2 hours.

When physical activation is applied after impregnation of chemicals, activation chemicals which have hitherto been used in producing activated carbon can be used. For instance, the oxidized fiber can be dipped in an aqueous solution of zinc chloride, phosphoric acid, sulfuric acid, sodium hydroxide, hydrochloric acid, or the like (in the case of hydrochloric acid, generally from about 10 wt% to 37 wt%, and in the case of other chemicals, generally from about 10 wt% to 60 wt%). Alternatively, solutions of these materials are sprayed on the fiber to deposit them thereon. Thereafter, the fiber is activated in an activation gas, in general, at from about 700° C. to 1,000° C., for from about 1 minute to 3 hours. In this case, the amount of the chemical (solute) deposited is from about 0.1 wt% to 20 wt%, based on the weight of the fiber. Of course, it is possible to deposit an amount of more than 20 wt%, but no special effect due to such a large amount is obtained.

In this activation processing, the fiber is preferably allowed to shrink freely. The shrinkage is generally from about 10% to 30%, depending on the particular fiber oxidized.

By this activation, the volatile component of the fiber is removed, and the fiber is carbonized, and at the same time, the specific surface area of the fiber is increased.

The thus-obtained fibrous activated carbon has a specific surface area of from about 300 to 2,000 $m^2$/g, a nitrogen content of from about 2 to 15% by weight, fiber strength of from about 25 to 35 $kg/mm^2$ and a diameter of from about 3 to 30 $\mu$m.

In the present invention it is important that in the activation step the iron compound in the preoxidized fiber accelerates the activation reaction, thus shortening the activation time and increasing the yield as compared with the prior art method. The iron compound should remain in the fiber in an amount more than 0.01 wt%, and preferably more than 0.05 wt% based on fibrous activated carbon and calculated as iron element. However, it should not exceed 1 wt%, and preferably 0.3 wt%, in order to prevent over-activation and to prevent deterioration of mechanical strength of the fibrous activated carbon obtained.

When the amount of the iron compound in the fibrous activated carbon exceeds the above-described amount, the excess amount of the iron compound should be removed prior to conducting activation, i.e. it should be removed from the preoxidized fiber after preoxidation process. The iron compound can be removed by washing the preoxidized fibers with water, preferably warmed to from about 50° to 100° C., or with an aqueous organic acid solution. Usually, 0.1 to 5 wt% of the organic solution is preferably used. The organic acid includes, for example, acetic acid, tartaric acid and oxalic acid. It is efficient to apply a mechanical vibration to fibers in the solution for removing the iron compound.

A beneficial effect of this invention is that the cost of fibrous activated carbon can markedly be reduced in comparison with the prior art method since the preoxidation and activation steps are improved at the same time by use of the acrylonitrile-based fiber containing the iron compound.

Another very important effect of this invention is that a fibrous activated carbon having a high nitrogen content as compared with the prior art method can be obtained. Therefore, the inherent characteristic of the fibrous activated carbon produced from the acrylonitrile-based fiber, i.e., an adsorption capability for acidic gases such as mercaptan, hydrogen sulfide, $SO_x$, $NO_x$, etc. can be further improved.

Furthermore, since the iron compound deposited on the fibrous activated carbon remains, the catalytic performance of the fibrous activated carbon is greatly increased. In particular, the present fibrous activated carbon is effective as a catalyst for use in the decomposition of ozone, hydrogen cyanide, etc.

The following examples are given to illustrate this invention in greater detail.

EXAMPLE 1

Three acrylonitrile-based fibers having a diameter of 3 denier and containing as a comonomer methyl acrylate in different amounts were soaked in a 2% aqueous solution of ferrous sulfate for 5 minutes at 60° C. and then dried to obtain the corresponding acrylonitrile-based fibers containing from 0.05 wt% to 0.6 wt% of iron. These fibers were then oxidized in air.

In this example, the preoxidation was carried out at two stages: initial stage at 230° C. to 275° C. (initial heat-treatment temperature) for 0.5 to 2.5 hours; and later stage at 250° C. to 280° C. for 0.5 to 2 hours.

For comparison, other acrylonitrile-based fibers having the same composition as above, but containing no iron compounds, were preoxidized analogously in two stages.

The results are shown in Table 3.

tive humidity of 60% is passed through a fibrous activated carbon (in a felt form) at a flow rate of 0.5 m/sec.

As apparent from the above results, when the iron content is outside the range defined in this invention, the effect of this invention cannot be obtained even if the preoxidation is carried out at a suitable initial heat-treatment temperature. In particular, when the iron content is excessive, the yield of fibrous activated carbon and fiber strength are markedly reduced. Furthermore, even if the iron content is within the range defined in this invention, when the initial heat-treatment temperature is higher than the upper limit of the range

TABLE 3

| Run No. | Comonomer Content (% by weight) | Fe Content (% by weight) | Preoxdation Conditions Temp. (°C.) × Time (hrs) Initial Stage | Later Stage | Coalescence | Equilibrium Water Content (%) |
|---|---|---|---|---|---|---|
| 6 |  | 0 | 260 × 0.75 | 275 × 1 | great | 11.1 |
| 7 |  | 0.11 | 270 × 0.5 | 280 × 1 | none | 11.5 |
| 8 | 2.1 | 0.11 | 275 × 0.5 | 280 × 0.5 | slight | 11.7 |
| 9 |  | 0.33 | 275 × 0.5 | 280 × 0.5 | slight | 11.8 |
| 10 |  | 0 | 245 × 1.5 | 265 × 2.5 | marked | 11.5 |
| 11 |  | 0.13 | 250 × 1 | 270 × 2 | none | 11.6 |
| 12 | 5.3 | 0.16 | 265 × 0.5 | 285 × 1.5 | none | 11.8 |
| 13 |  | 0.43 | 270 × 0.5 | 285 × 1 | great | 11.3 |
| 14 |  | 0 | 230 × 3 | 250 × 3 | marked | 12.0 |
| 15 |  | 0.15 | 235 × 2.5 | 255 × 2 | none | 11.3 |
| 16 |  | 0.21 | 240 × 1.5 | 260 × 2 | none | 12.1 |
| 17 | 9.6 | 0.21 | 245 × 1 | 265 × 1.5 | slight | 11.9 |
| 18 |  | 0.21 | 250 × 0.75 | 270 × 1 | small | 11.5 |
| 19 |  | 0.21 | 255 × 0.5 | 275 × 1 | marked | 12.6 |
| 20 |  | 0.51 | 245 × 1 | 265 × 1.5 | none | 12.1 |

Run Nos. 7, 8, 11, 12 and 15 to 18 are according to the method of this invention.

The above-obtained preoxidized fibers were each activated at 880° C. in superheated steam to obtain the corresponding fibrous activated carbon having a specific surface area of 900 m²/g. The yield and performance of these fibrous activated carbons are shown in Table 4.

TABLE 4

| Run No. | Yield of Fibrous Activated Carbon (%) | Nitrogen Content (%) | Fiber Strength (Kg/mm²) | Ozone Adsorption Amount (%) |
|---|---|---|---|---|
| 6 | 14 | 3.5 | 30.3 | 10 |
| 7 | 16 | 3.8 | 33.5 | 19 |
| 8 | 16 | 3.8 | 33.8 | 19 |
| 9 | 11 | 3.0 | 21.3 | 17 |
| 10 | 18 | 3.8 | 35.3 | 11 |
| 11 | 18 | 3.7 | 39.5 | 21 |
| 12 | 19 | 3.8 | 36.8 | 20 |
| 13 | 10 | 2.9 | 21.9 | 18 |
| 14 | 28 | 4.5 | 35.8 | 13 |
| 15 | 30 | 4.8 | 44.5 | 17 |
| 16 | 29 | 4.5 | 44.1 | 18 |
| 17 | 28 | 4.4 | 42.2 | 20 |
| 18 | 28 | 4.4 | 40.3 | 24 |
| 19 | 23 | 3.9 | 29.7 | 23 |
| 20 | 21 | 3.2 | 30.8 | 21 |

Run Nos. 7, 8, 11, 12 and 15 to 18 were according to the method of this invention.

By the term "ozone adsorption amount" as used in Table 4 is meant the amount of ozone adsorbed on or decomposed by a fibrous activated carbon until the ratio of the concentration in outlet to the concentration in inlet (concentration in outlet/concentration in inlet) reaches 0.05 (hereinafter, called the "break point") when air containing 1 ppm of ozone and having a relalimited by the comonomer content, the coalescence of fibers is not improved and the quality of the fibrous activated carbon is lowered, and when the temperature is lower than the lower limit of the range, the preoxidation takes for long time.

According to the method of this invention, the preoxidation step is markedly improved and furthermore the fibrous activated carbon can be produced in high yields. In particular, the method of this invention is extremely effective in treating those acrylonitrile-based fibers containing a high content of a comonomer, for example, containing more than 8% of a comonomer.

The fibrous activated carbon obtained by the method of this invention has a high nitrogen content and a good fiber strength, and is particularly excellent in adsorption of ozone, etc.

EXAMPLE 2

A copolymer fiber having a diameter of 5 denier and consisting of 92% by weight of acrylonitrile and 8% by weight of vinyl acetate was soaked in a 1.5% of aqueous solution of ferric ammonium nitrate and dried to obtain an acrylonitrile based fiber containing 0.25% by weight of iron. This acrylonitrile-based fiber was heated in air for 1 hour at an initial temperature of 250° C. to obtain a fiber having an equilibrium water content of 3.2%, and then for 0.5 hour at 260° C. and for 0.5 hour at 270° C. to obtain a flexible preoxidized fiber which had an equilibrium water content of 12.4% and was free of any coalescence.

Thereafter, the preoxidized fiber was activated in superheated steam at 900° C. for 10 minutes to obtain a fibrous activated carbon in a yield of 20% and a specific surface area of 1,000 m²/g.

This fibrous activated carbon had a fiber strength of 24.3 Kg/mm² and a benzene adsorption amount of 56% as measured according to JIS K1474.

For comparison, an acrylonitrile-based fiber having the same composition as above, but containing no iron was preoxidized for 2 hours at 230° C., for 2 hours at 250° C. and for 3 hours at 265° C. to obtain a preoxidized fiber having an equilibrium water content of 12.1%. Although the preoxidation was carried out at lower temperature than in the method of this invention, the obtained preoxidized fiber was subject to coalescence and rigid.

This preoxidized fiber was activated in superheated steam at 900° C. for 40 minutes to obtain a fibrous activated carbon having a specific surface area of 1,000 m²/g. The fiber strength and benzene adsorption amount of the fibrous activated carbon were respectively 16.5 Kg/mm² and 54%, which are inferior to those in the method of this invention.

EXAMPLE 3

An acrylonitrile copolymer consisting of 92% by weight of acrylonitrile, 6% by weight of methyl acrylate and 2% by weight of acrylamide was dissolved in a 60% solution of zinc chloride to give a copolymer solution. To this copolymer solution was added ferric oxide having a particle diameter of 0.1 to 0.3μ. The resulting solution was spinned to obtain a fiber containing 0.14% by weight of iron and having a diameter of 3 denier.

The thus obtained fiber was oxidized in air for 0.5 hour at an initial temperature of 250° C., and furthermore for 0.5 hour at 275° C., i.e. until the equilibrium water content reached 12% to obtain a preoxidized fiber free of coalescence.

This preoxidized fiber was further activated in superheated steam at 800° C. to obtain a fibrous activated carbon having a specific surface area of 880 m²/g in a yield of 23%.

For comparison, a fiber having the same composition as above, but containing no iron was treated. In this case, the preoxidation for 5 hours at 220° C. and further for 2 hours at 240° C. was needed to obtain a preoxidized fiber having an equilibrium water content of 12% under such conditions as not to produce coalescence. Then, the preoxidized fiber was activated to obtain a fibrous activated carbon in a yield of 18%, a specific surface area of 900 m²/g.

Hydrogen cyanide adsorption capabilities of the above obtained fibrous activated carbon and the comparative fibrous activated carbon were compared. That is air containing 2,000 ppm of hydrogen cyanide (relative humidity was 60%) was passed through the fibrous activated carbon (in a felt form) and the adsorption amount until reach to the break point, was measured. The adsorption amount of the comparative fibrous activated carbon obtained by the prior art method was 5%, whereas that of the present fibrous activated carbon obtained by the method of this invention, 18%. Thus, the fibrous activated carbon is significantly improved in adsorption capability and effectiveness for use in the removal of toxic gases.

While the invention has been described in detail and with reference to specific embodiments thereof, it will be apparent to one skilled in the art that various changes and modifications can be made therein without departing from the spirit and scope thereof.

What is claimed is:

1. A process for producing a fibrous activated carbon which comprises
   (1) spinning a dope of a polyacrylonitrile or a copolymer thereof comprising at least about 60 wt% acrylonitrile to thereby obtain an acrylonitrile-based fiber having a diameter of from 1.5 to 15 denier,
   (2) treating the acrylonitrile-based fiber with a solution of an iron compound to thereby obtain an acrylonitrile-based fiber containing the iron compound in the range satisfying the equation (1)

$$0.02\sqrt{X} + 0.02 \leq y \leq 0.05\sqrt{X} + 0.10 \tag{1}$$

wherein X is the wt% content of comonomer in the acrylonitrile-based fiber and y is the wt% iron content,
   (3) preoxidizing the acrylonitrile-based fiber containing the iron compound at an initial heat-treatment temperature satisfying the equation (2)

$$280 - 5X \leq Z \leq 290 - 4X$$

wherein X has the same meaning as in equation (1) and Z is the initial heat-treatment temperature (°C.), the iron compound preventing substantial coalescence during preoxidizing, and
   (4) then gas activating the preoxidized acrylonitrile-based fiber.

2. A process as in claim 1, wherein said copolymer comprises from about 6 to 40 wt% of at least one comonomer.

3. A process as in claim 1, wherein said copolymer comprises from about 8 to 15 wt% of at least one comonomer.

4. A process as in claim 1, wherein said fiber has a diameter of from 2.0 to 7.0 denier.

5. A process as in claim 1, wherein said iron compound is an iron salt or an iron-complex salt.

6. A process as in claim 1, wherein said iron compound is ferric or ferrous sulfate, ferric or ferrous chloride, ferric or ferrous nitrate, ferric or ferrous ammonium nitrate, ferric or ferrous oxide, sodium or potassium ferricyanide, or sodium or potassium ferrocyanide.

7. A process as in claim 1, wherein said acrylonitrile-based fiber containing an iron compound is obtained by impregnating a gel fiber of the acrylonitrile-based fiber after spinning and prior to drying with a solution of the iron compound.

8. A process as in claim 1, wherein said acrylonitrile-based fiber containing an iron compound is obtained by soaking the fibers with a solution of the iron compound.

9. A process as in claim 1, wherein said acrylonitrile-based fiber is in the form of a tow, felt, woven fabric, or nonwoven fabric.

10. A process as in claim 1, wherein said acrylonitrile-based fiber is in the form of a tow consisting of more than about 40,000 filaments.

11. A process as in claim 1, wherein said acrylonitrile-based fiber is in the form of felt, woven fabric, or nonwoven fabric having a weight of more than 150 g/cm².

12. A process as in claim 1, wherein said acrylonitrile-based fiber is preoxidized until the equilibrium water content of said fiber reaches from 8 to 13%.

13. A process as in claim 1, wherein said preoxidized fiber is activated by heating in $CO_2$, $NH_3$, steam, or a mixed gas thereof at a temperature of from about 600° to 1,300° C.

14. A process as in claim 1, wherein said preoxidized fiber is activated until the specific surface area of the fibrous activated carbon reaches from about 300 to 2,000 m²/g.

15. A process as in claim 14, wherein said fibrous activated carbon contains from about 2 to 15 wt% nitrogen.

16. A process as in claim 1, wherein after preoxidation at said initial heat-treatment temperature the fiber is preoxidized at a higher temperature which is less than about 400° C.

17. A fibrous activated carbon containing an iron compound having a specific surface area of from about 300 to 2,000 m²/g, a nitrogen content of from about 2 to 15 wt%, a fiber strength of from about 25 to 35 Kg/mm² and a diameter of from about 3 to 30μ, said fibrous activated carbon being produced by the process which comprises
   (1) spinning a dope of a polyacrylonitrile or a copolymer thereof comprising at least about 60 wt% acrylonitrile to thereby obtain an acrylonitrile-based fiber having a diameter of from 1.5 to 15 denier,
   (2) treating the acrylonitrile-based fiber with a solution of an iron compound to thereby obtain an acrylonitrile-based fiber containing the iron compound in the range satisfying the equation (1)

$$0.02 \sqrt{X} + 0.02 \leq y \leq 0.05 \sqrt{X} + 0.10 \quad (1)$$

wherein X is the wt% content of comonomer in the acrylonitrile-based fiber and y is the wt% iron content,
   (3) preoxidizing the acrylonitrile-based fiber containing the iron compound at an initial heat-treatment temperature satisfying the equation (2)

$$280 - 5X \leq Z \leq 290 - 4X$$

wherein X has the same meaning as in equation (1) and Z is the initial heat-treatment temperature (°C.), the iron compound preventing substantial coalescence during preoxidizing, and
   (4) then gas activating the preoxidized acrylonitrile-based fiber.

* * * * *